(12) United States Patent
Kitsis et al.

(10) Patent No.: US 8,370,399 B2
(45) Date of Patent: Feb. 5, 2013

(54) BUILDING, VIEWING, AND MANIPULATING SCHEMA SETS

(75) Inventors: Stanislav Kitsis, Snoqualmie, WA (US); Kevin H. Krouse, Seattle, WA (US); Peter F. Drayton, Redmond, WA (US); Federico A. Garcia, Issaquah, WA (US); Steven P. Lindeman, Issaquah, WA (US); Christopher J. Lovett, Woodinville, WA (US); Alvaro de Matos Miranda, Seattle, WA (US); David L. Remy, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 434 days.

(21) Appl. No.: 11/770,708

(22) Filed: Jun. 28, 2007

(65) Prior Publication Data

US 2008/0133553 A1    Jun. 5, 2008

Related U.S. Application Data

(60) Provisional application No. 60/868,485, filed on Dec. 4, 2006.

(51) Int. Cl.
*G06F 17/30* (2006.01)
(52) U.S. Cl. ........ 707/803; 707/802; 715/234; 715/239; 717/136
(58) Field of Classification Search .................. 707/802, 707/803; 715/234, 239; 717/105, 136
See application file for complete search history.

(56) References Cited

U.S. PATENT DOCUMENTS

| | | | |
|---|---|---|---|
| 6,611,843 B1 | 8/2003 | Jacobs | |
| 6,910,040 B2* | 6/2005 | Emmick et al. | 707/8 |
| 6,950,815 B2* | 9/2005 | Tijare et al. | 707/1 |
| 6,990,654 B2 | 1/2006 | Carroll, Jr. | |
| 7,017,112 B2 | 3/2006 | Collie et al. | |
| 7,249,316 B2* | 7/2007 | Collie et al. | 715/209 |
| 7,260,585 B2* | 8/2007 | Krishnaprasad et al. | 707/102 |
| 7,313,756 B2* | 12/2007 | Panditharadhya et al. | 715/205 |
| 7,539,747 B2* | 5/2009 | Lucovsky et al. | 709/224 |
| 2002/0147745 A1* | 10/2002 | Houben et al. | 707/513 |
| 2003/0195885 A1* | 10/2003 | Emmick et al. | 707/8 |
| 2003/0204481 A1* | 10/2003 | Lau | 707/1 |
| 2003/0204511 A1* | 10/2003 | Brundage et al. | 707/100 |
| 2003/0225774 A1* | 12/2003 | Davidov et al. | 707/100 |
| 2004/0254922 A1* | 12/2004 | Vincent, III | 707/3 |
| 2005/0050054 A1* | 3/2005 | Clark et al. | 707/100 |
| 2005/0120029 A1* | 6/2005 | Tomic et al. | 707/100 |

(Continued)

FOREIGN PATENT DOCUMENTS

EP    1225516 A1 *  7/2002
JP    2002318798 A *  10/2002

(Continued)

OTHER PUBLICATIONS

Storing and querying XML data using denormalized relational databases, Andrey Balmin and Yannis Papakonstantinou, 2005, The VLDB Journal—The International Journal on Very Large Data Bases, vol. 14 , Issue 1, pp. 30-49, retrieved from ACM digital library.*

(Continued)

*Primary Examiner* — Shahid Alam (57) ABSTRACT

A schema development system is provided. The system includes a location component to automatically determine members of a schema set. A processor component performs software development operations across the schema set. The members of the schema set can be implicitly determined from at least one development file, where the development file can be an XML file or an XSD file, for example.

19 Claims, 10 Drawing Sheets

U.S. PATENT DOCUMENTS

| | | | |
|---|---|---|---|
| 2005/0125431 A1* | 6/2005 | Emmick et al. | 707/100 |
| 2006/0004827 A1 | 1/2006 | Stuart | |
| 2006/0041838 A1 | 2/2006 | Khan | |
| 2006/0047648 A1 | 3/2006 | Martin | |
| 2006/0122961 A1 | 6/2006 | Kalia et al. | |
| 2006/0195413 A1* | 8/2006 | Davis et al. | 707/1 |
| 2006/0271506 A1 | 11/2006 | Bohannon et al. | |
| 2007/0043702 A1 | 2/2007 | Lakshminarayanan et al. | |
| 2007/0083543 A1 | 4/2007 | Chen | |

FOREIGN PATENT DOCUMENTS

| | | | |
|---|---|---|---|
| JP | 2004295674 A | * | 10/2004 |
| WO | WO 2004107195 A1 | * | 12/2004 |

OTHER PUBLICATIONS

D. Chamberlin. XQuery: An XML Query Language. vol. 41, No. 4, 2002. Accepted for publication Jun. 17, 2002; Internet publication Oct. 29, 2002 http://www.research.ibm.com/journal/sj/414/chamberlin.html. Last accessed Apr. 24, 2007.

Exchanger XML Editor—XML Schema, RelaxNG and DTDs. 2005 Cladonia Ltd. http://www.exchangerxml.com/editor/pdf/XMLSchemaDTDRelaxNGUS.pdf. Last accessed Apr. 24, 2007.

Gargi M. Sur. Implementing Update Extensions to Xquery 1.0. Aug. 2003, Florida http://etd.fcla.edu/UF/UFE0001184/su_g.pdf. Last accessed Apr. 24, 2007.

* cited by examiner

BUILDING, VIEWING, AND MANIPULATING SCHEMA SETS

CROSS REFERENCE TO RELATED APPLICATION

This application claims the benefit of U.S. Provisional Patent Application Ser. No. 60/868,485 filed on Dec. 4, 2006, entitled "BUILDING, VIEWING, AND MANIPULATING SCHEMA SETS" the entirety of which is incorporated herein by reference.

BACKGROUND

Extensible Markup Language (XML) is a common data language employed for various applications such as website development and other applications typically designed for the Internet. Generally, XML is considered a markup language for documents containing structured information. Structured information includes both content (words, pictures, and so forth) and some indication of what role that content plays (for example, content in a section heading has a different meaning from content in a footnote, which means something different than content in a figure caption or content in a database table, and so forth). Almost all documents have some structure. Thus, a markup language such as XML provides a mechanism to identify structures in a document, where the XML specification defines a standard way to add markup to documents. Another aspect of XML is referred to as XSD which is an XML based language that defines validation rules for XML files, where XSD can be employed for XML Schema Definition. Generally, XSD is an XML based language which implies that XSD statements are written in XML files. One important function of XSD is that it defines validation rules for XML files, meaning that XSD can be utilized to replace Document Type Definitions (DTD), which is another language for defining XML validation rules.

Since the structure of XML files and XSD definitions is defined by textual data and statements, tools for manipulating such languages have not developed along a similar path such as traditional code-based models for developing source code for example. For instance, code-based models typically operate with object classes where tools have developed over time to create desired software functionality. Although XML and XSD type declarations may have some similarity to previous code-based models and class structures, the differences with code-based models are such that XML/XSD tools over the last several years have developed according to a different path offering different types of functionality than code-based tools. One area where this difference is stark and apparent is in how files are operated upon in the XML/XSD development environment where files are processed according to a "one-file-at-a-time" format which provides substantial challenges to developers.

In one are where such challenges are encountered, a large number of XML schemas likely contain multiple XSD files. A collection of XSD files that define a single XML schema is referred to as a schema set where the larger the domain described by the schema, the larger its schema set. For example, an HL7 schema includes multiple schema sets, which can have hundreds or thousands of XSD files. As noted above, tools that developers employ to work with schemas only work with one file at a time. This makes schema set operations either impossible or very difficult to achieve.

To illustrate the single file operation and processing problem, consider searching for a string in a schema set containing a large number of files. First, the user needs to know all the files in the set. To achieve this, the user would generally start with the top file in the set and then recursively traverse down its "include" files and import statements. Then, the user would have to either search each file individually or perform a bulk "find in files" operation. Searching files individually is very time consuming, especially for large schemas such as HL7. Performing bulk "find in files" operation is also not trivial, since the files can be located in multiple folders, on multiple machines or in multiple internet locations.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Set-based tools and methods are provided that enable manipulation, viewing, and development across schema sets in contrast to conventional single file schema operations. In one aspect, a file or subset of files is designated for development operations such as in the context of a software development environment. From the file (or file subset) designated for operations, links to other related files are automatically determined and located from schema directories, Internet locations, local directories and so forth. A schema set is automatically constructed which is then employed for further operations. By automatically building a set of files and later performing operations on the set, much time is saved over conventional single file manipulation operations. For example, after building the schema set, search operations can be performed across the set as opposed to individually trying to locate files and then individually searching the files to potentially find relevant data. Set-based operations can include semantic queries in another example where a developer can locate data items that may be associated with one or more other data items related to a query. Other features include editing and developing across the schema set. Thus, if a change were made in one portion of the schema set, the change can be propagated to other related members of the set. This mitigates having to manually search for related files and then manually performing desired operations on the files as is the case with conventional single file development systems.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

A schema development system is provided. The system includes a location component to automatically determine members of a schema set. A processor component performs software development operations across the schema set. The members of the schema set can be implicitly determined from at least one development file, where the development file can be an XML file or an XSD file, for example. The software development operations can be associated with at least one of a search operation or a semantic query, for example.

As used in this application, the terms "component," "query," "schema," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
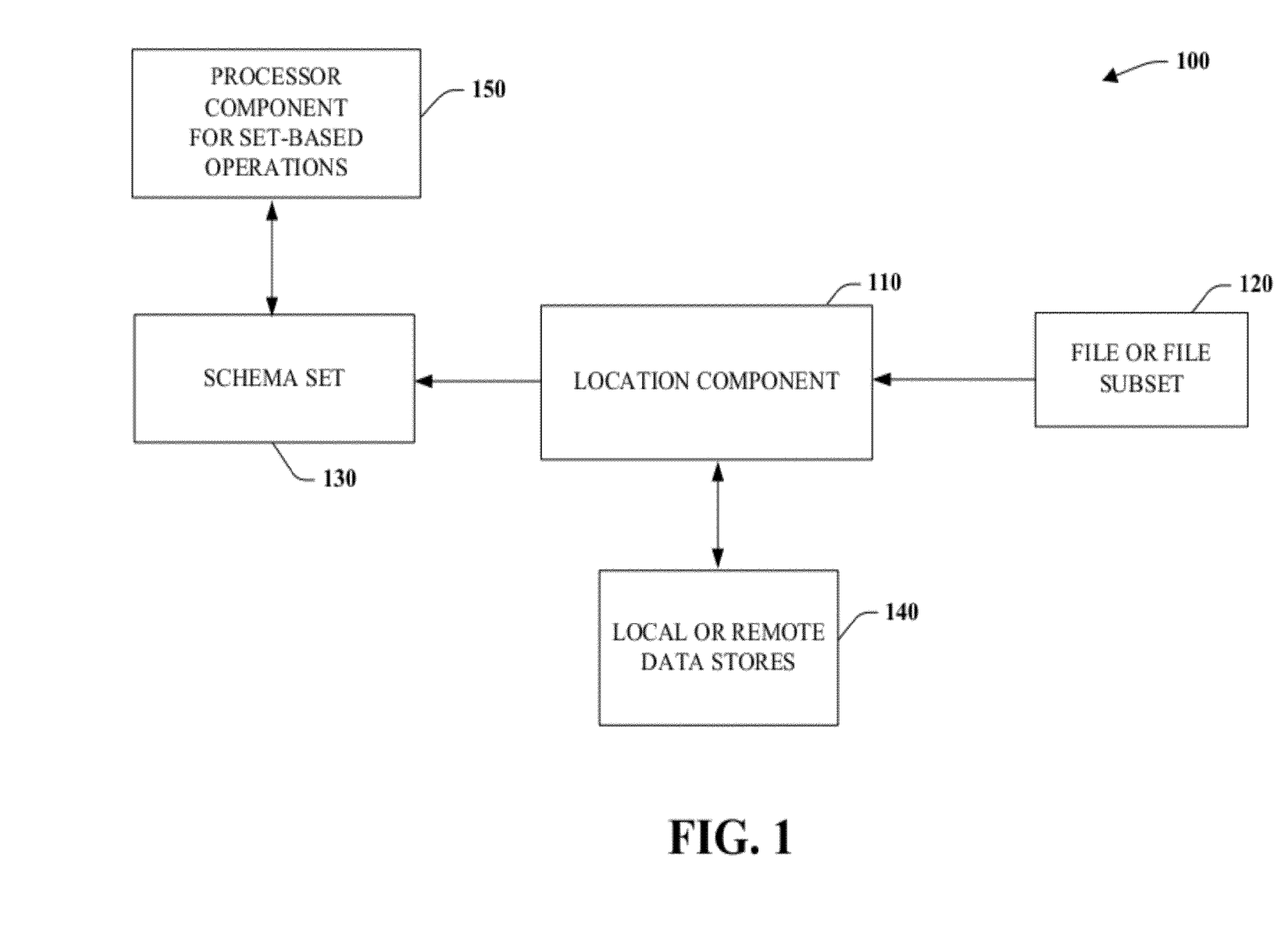
FIG. 1 is a schematic block diagram illustrating a set-based development system.

Referring initially to FIG. 1, a set-based development system 100 is illustrated. The system 100 includes a location component 110 that receives a schema file 120 (e.g., XML or XSD file) and builds a schema set 130 from the file. It is noted that the schema file 120 can be a single file or a smaller subset of files from which a larger schema set 130 is constructed. Also, as the term file is used herein, it is noted that schemas can be stored in files, file fragments, database tables and so forth, where the term file or files can also represent broader memory concepts such as data stores. As shown, the schema set 130 can be constructed from one or more local or remote data stores at 140. These can include local file directories, project files, and websites, for example that specify one or more elements of the schema files 120. By analyzing the file 120, the location component 110 can determine such aspects as include statements and import statements, for example, to then search the data stores 140 and automatically construct the schema set 130. The location component 130 can also perform implicit operations such as searching though directories or data stores 140 that potentially may have related schemas or data to construct the schema set 130. When the schema set 130 has been constructed, a processor component 150 processes the set as a group of related files to facilitate schema development operations. Such set-based operations can include searching across the set 130, performing semantic queries across the set, manipulating data as a set (e.g., editing one member and propagating the edit across the set), viewing the set, and so forth.

Figure 3:
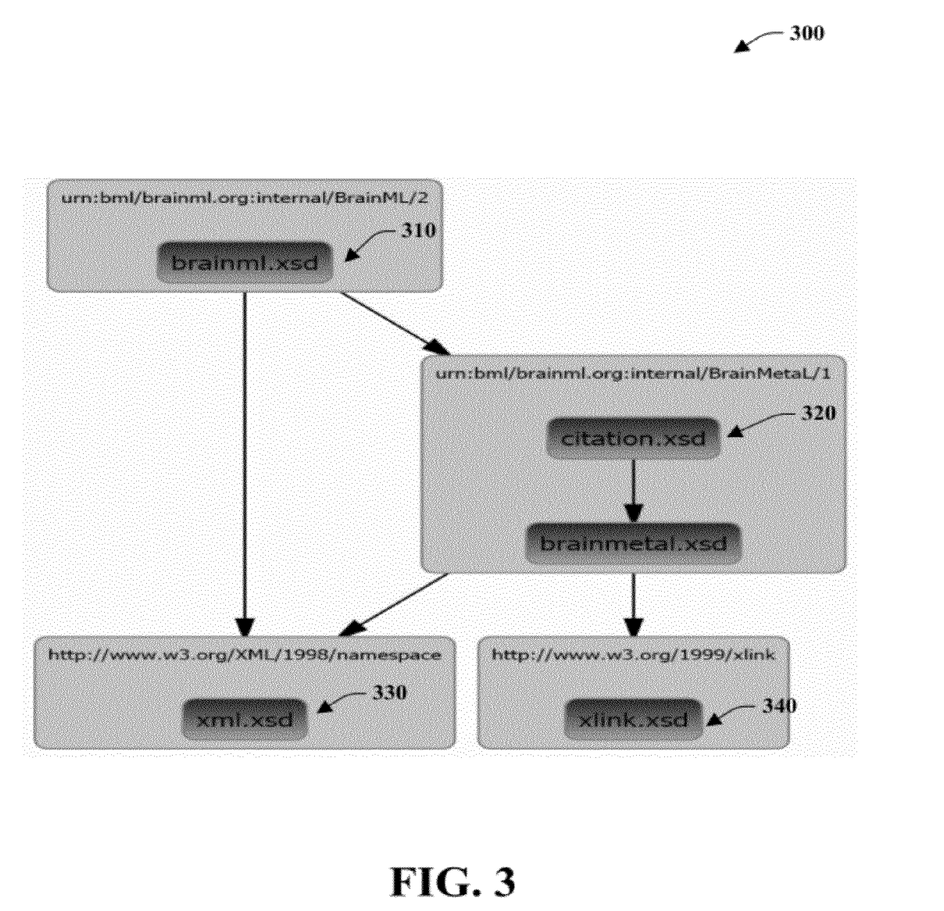
FIG. 3 is a diagram that illustrates an exemplary set of automatically constructed XSD files.

The system 100 facilitates automated operations and in particular building the schema sets 130. For example, when a user points to an XSD file at 120 (or other XML type), the location component 110 can recursively traverse a schema for includes and imports, create a schema set at 130 and perform all user operations (such as search, go to definition, show all references, and so forth) on the schema set via the processor component 150. The system 100 provides tools to automatically create the schema set 130 for the user, performing user operations on the schema set as opposed to a single file, and displaying to the user a structure of the entire set and not just a single file such as illustrated in FIG. 3 for example.

The common paradigm used by existing tools is that "users work with files that they opened." The system 100 changes this model to include "working with schema sets 130." Schema sets 130 can include XSD files that may or may not be opened by users. When users open an XSD file at 120 for instance, the location component 110 finds other XSD files explicitly and/or implicitly referenced by the original file and creates the schema set 130. This resulting set 130 can be displayed to the users and employed for other operations. Some conventional systems can build schema sets however they build them using only explicit references and use the sets only for validation of a single XSD file (the one that was opened by the user). All other operations in existing tools are performed against that same single file. Thus, for example, if searching for a string in existing tools, they will display results in the file single opened but not related files.

Projects generally have a file that describes what files and resources are in the project, so that the tools know how to create it. In some cases, XSD files have explicit references to other XSD files (listing namespace/URI pairs or just URI location). In other cases, XSD files have references to namespaces without specifying a URI. In addition, all files in the project are usually under the developers' control. With schemas, a lot of files included in schema sets 130 can be outside of the developers' control (for example all w3c standards and industry schema references). These files outside the developers control can be automatically located and included in the schema sets 130. In another aspect, a schema development system is provided via the system 100. This includes means for identifying components of a schema (location component 110) in order to automatically determine members of the schema set 140. The system 100 also means for processing the schema set 140 (processing component 150) to facilitate software development across the schema set.

Figure 2:
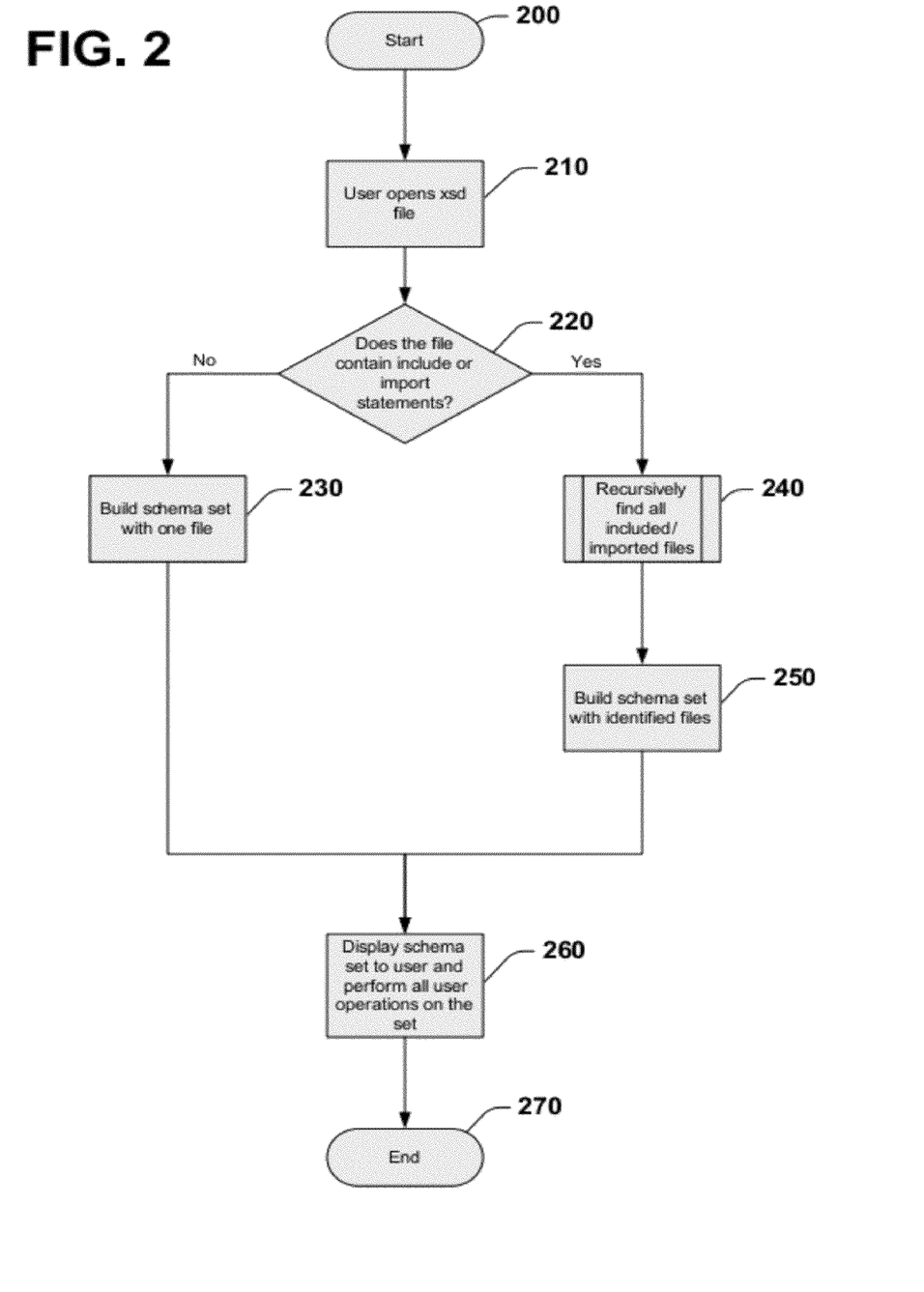
FIG. 2 is a flow diagram that illustrates a set-based process for schema development.

FIG. 2 illustrates an exemplary process 200 for determining and operating on schema sets. While, for purposes of simplicity of explanation, the process is shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Proceeding to 210 of FIG. 2, a user opens (or indicates in some manner) an XSD file for example. At 220, a decision is made as to whether or not the file opened at 210 provides indicators such as include statements, import statements, and so forth that may indicate other related files exist. If no such statements are found, the process proceeds to 230 and builds a schema set from the file opened at 210. This can include searching local and remote directories to infer potentially related files at 230. If the file opened at 210 does include import or include type instructions at 220, the process proceeds to 240 and recursively searches for other related files that are indicated by the include and/or import type statements. At 250, a schema set is automatically constructed with identified files from the import or include statements. At 260, schema sets that are automatically constructed at 230 or 250 can be displayed and further process by the user as a set as opposed to single file operations in conventional systems. This can include searches, queries, manipulations, and so forth that are performed across the set. After respective operations are performed at 260, the process ends at 270. As can be appreciated, further operations can be performed on the schema sets that are automatically constructed at 230 and/or 240.

Referring now to FIG. 3, an example schema set 300 is illustrated. Before proceeding, it is noted that a small subset of files are shown in the respective schema set 300. It is to be appreciated that a plurality of files can be located and subsequently included within a given schema set depending on a given application. At 310, an initial XSD (or other type markup file) is indicated. This could include a user hovering over a file, opening a file, or other activity to indicate to a system that a file is to be processed. From the initial file selected at 310, the system automatically locates related files and constructs the schema set 300. In this example, the system locates files at 320, 330, and 340. From the located or determined files, the schema set can be displayed as shown in the example 300, where relationships between members can be indicated via arrows or other indicators (e.g., colors, numbers, letters, and so forth).

Figure 4:
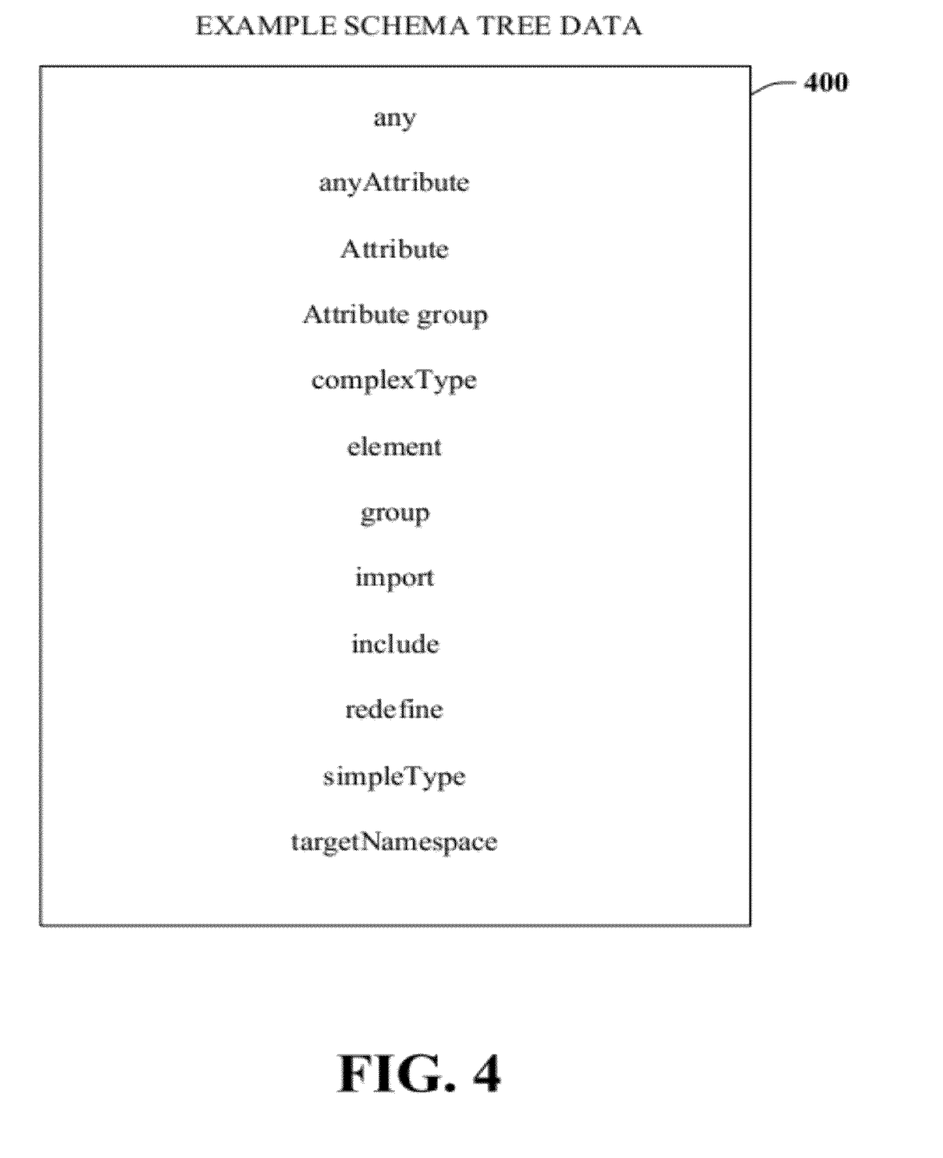
FIG. 4 is a diagram of example data contents for a schema tree.

Referring to FIG. 4, example data contents for a schema tree 400 is illustrated that may be employed with the schema set and processing components described above. Generally, a Schema interface (examples shown below) displays pre-compiled schema set information in a tree structure organized in the following example. As can be appreciated, other configurations are possible.

1. Top level—a schema set node. This node can have a name (if the set was open through a schema set file).
2. Under the schema set node—namespaces
3. Under namespaces—files
4. Under files—globals (elements, groups, complex types, simple types, attributes, attribute groups)
5. Under globals—content models. Content models can be shown to the depth they have in the respective .xsd files. In other words, the references are not generally expanded.

A Schema Set may appear as follows:

As illustrated in FIG. 4, various example data structures can be employed within the tree 400. These data structures at 400 may include one or more of the following components such as an any field, an anyAttribute field, an attribute field, an attributeGroup, a complexType, an element field, a group, field, an Import field, an include field, a redefine field, a simpleType, and a targetNamespace, for example. These data structure examples are now described in more detail as follows:

any

<xs:any> schema element can appear under the following parents:
  Choice
  Sequence
The following applies to <xs:any> schema elements.
xs:any nodes are represented in the SE by the following items:
  an icon
  different icons to represent min/maxOccurs ranges 0-1, 1-1, 0-unbounded, 1-unbounded
  text "any"
anyAttribute
<xs:anyAttribute> schema element can appear under the following parents:
  complexType
  Restriction
  Extension
  attribute Group
The following applies to <xs:anyAttribute> schema elements.
xs:anyAttribute nodes are represented in the SE by the following items:
  an icon
  text "anyAttribute"
  attribtute
<xs:attribute> schema element can appear under the following parents:
  Schema
  complexType
  Restriction
  Extension
  attribute Group
The following applies to <xs:attribute> schema elements.
xs:attribute nodes are represented in the schema interface by the following items:
  An icon
  different icons to represent references to global attributes vs. local attributes
  Name of the attribute.
  If this is a definition of the attribute, name is the "name" attribute.
  If this is a reference to a global attribute, name is the name of the global attribute (value of the "ref" attribute).
  If this attribute has "use" set to prohibited, the name of the attribute is crossed-out
  Type of the attribute (if the type is global)
  attributeGroup
<xs:attributeGroup> schema element can appear under the following parents:
  Schema
  Redefine
  attribute Group
  complexType
  Restriction
  Extension
The following applies to <xs:attributeGroup> schema elements.

xs:attributeGroup nodes are represented in the SE by the following items:
An icon
different icons to represent global attributeGroups vs. references to them
Name of the attributeGroup
If this is a global attributeGroup, name is the "name" attribute (value of the "name" attribute).
If this is a reference to a global attributeGroup, name is the name of the global attributeGroup (value of the "ref" attribute).
If this attribute group is redefined somewhere else in the schema, a glyph is shown to indicate this fact
complexType
<xs:complexType> schema element can appear under the following parents:
Schema
Redefine
element
The following applies to <xs:complexType> schema elements when they appear under
schema
redefine
ComplexType nodes are not displayed when their parent is <xs:element> xs:complexType nodes are represented in the SE by the following items:
an icon
name of the complex type
derivation section (for derived type)
an icon to represent derivation method (restriction or extension)
name of the base type
If this type is redefined somewhere else in the schema, a glyph is shown to indicate this fact
element
<xs:element> schema element can appear under the following parents:
schema
all
choice
sequence
The following applies to <xs:element> schema elements.
xs:element nodes are represented in the SE by the following items:
an icon
different icons to represent local elements vs. references to global elements
different icons to represent min/maxOccurs ranges (0-1, 0-unbounded, 1-1, 1-unbounded)
Name of the element
If this is a definition of the element, name is the "name" attribute.
If this is a reference to a global element, name is the name of the global element (value of the "ref" attribute).
Type of the element
If the type is global, name of the global type
If the type is locally defined and is not derived, the word "anonymous"
If the type is locally defined by derivation, derivation method icon (restriction, extension, list, union) followed by the base type name (or " . . . " if doesn't fit or if there're multiple types in case of a union)
example: <> elementName [R] baseTypeName
group
<xs:group> schema element can appear under the following parents:
schema
redefine
choice
complexType
extension
restriction
sequence
The following applies to <xs:group> schema elements.
xs:group nodes are represented in the SE by the following items:
An icon
different icons to represent global groups vs. references to them
Name of the group
If this is a global group, name is the value of the "name" attribute
If this is a reference to a global group, name is the name of the global group (value of the "ref" attribute).
If this group is redefined somewhere else in the schema, a glyph is shown to indicate this fact
Import
<xs:import> schema element can appear only under <xs:schema> node. In the interface, it can be shown as a child of a file node and is represented in the interface by the following items:
An icon
Namespace (string value of the namespace attribute). If <xs:import> statement does not have a namespace attribute (it is optional according to the spec), a string "Empty Namespace" should be displayed.
include
<xs:include> schema element can appear only under <xs:schema> node. In the interface, it is shown as a child of a file node and is represented in the interface by the following items:
An icon
Value of the "schemaLocation" attribute
redefine
<xs:redefine> schema element can appear only under <xs:schema> node. In the interface it is shown as a child of a file node and is represented in the interface by the following items:
An icon
Value of the "schemaLocation" attribute
A list of child nodes
Possible nodes are simpleType, complexType, group, and attributeGroup. These nodes are represented the same way as derived global nodes (e.g., nodes that appear under <xs:redefine> in the xsd file are shown in the interface).
When a schema component is redefined, the old one and the new schema are shown in the interface. The old component can have an indicator (via an icon/glyph) that it has been redefined. The new component can appear under redefine parent if files are not filtered in the interface tree. If files are filtered, the new node can appear on the same level as other globals. The new component can have an option on the context menu to "go to original definition". The old component can have an option on the context menu to "go to redefinition". If there is more than one redefinition of a schema component, the redefinitions are shown and an error is reported.
simpleType
<xs:complexType> schema element can appear under the following parents:
Schema
Redefine
Element Attribute
List
Union
Restriction The following applies to <xs:simpleType> schema elements when they appear under
schema
redefine
simpleType nodes in other cases are not displayed.
xs:simpleType nodes are represented by the following items:
an icon
name of the simple type
derivation section (for derived type)
an icon to represent derivation method (restriction, list or union)
name of the base type
If this type is redefined somewhere else in the schema, a glyph is shown to indicate this fact
targetNamespace
targetNamespace appears as an attribute of the <xs:schema> node. It is shown in as a child of the SchemaSet node and is a parent to file nodes that define the same target namespace. It is represented in the interface by the following items:
an icon
name of the targetNamespace
If the targetNamespace attribute is absent, string "Empty Namespace"

Figure 5:
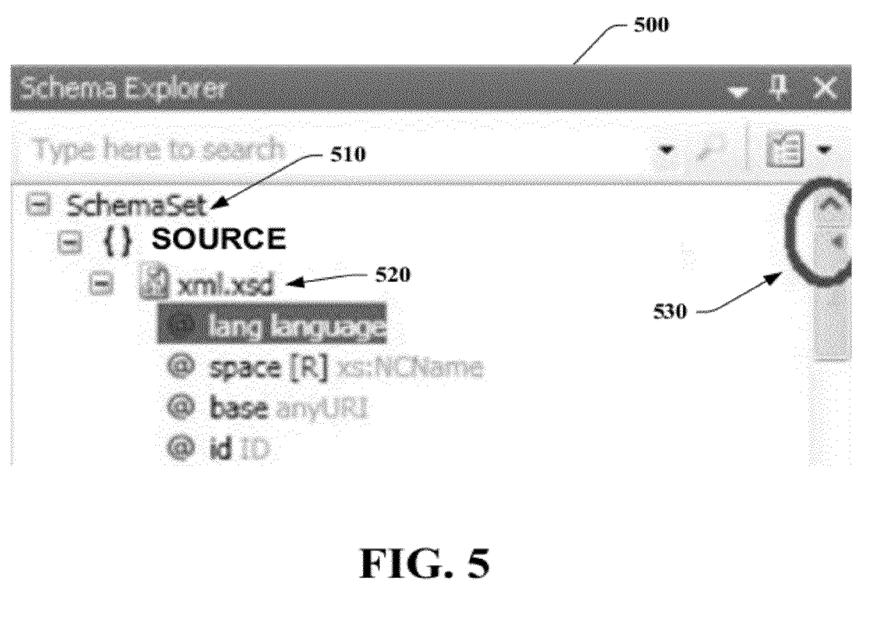
FIG. 5 illustrates an example initial interface when a schema set node is selected.

Referring now to FIG. 5, an initial interface 500 is shown when a schema set node is selected. A top schema set node at 510 is selected. If users open an XSD file, initial view of the interface shows the top schema set node (titled "SchemaSet") and is expanded to show namespaces contributing to the set. In addition, the namespace that contains an opened file at 520 is expanded to show its files and the file opened by users is selected. It is possible in case of a chameleon include to have a situation where an opened file belongs to multiple namespaces. In this case, these namespaces are expanded to show their files and the file under "Empty Namespace" is selected.

Selecting a node in the Schema Explorer will highlight the node and display its properties in a Property Window (not shown). A tick mark 530 can be displayed on the scroll bar to indicate position of the currently selected node in the tree relative to the rest of the schema set. Activating a node (double-clicking a node or pressing "Enter" when a node is selected) will highlight the node and display its properties in the Property Window. Activating a Schema Set node displays the File & Namespace View. Activating an element/type/attribute/group/attr.group can display its content model in the Content Model View, for example.

Figure 6:
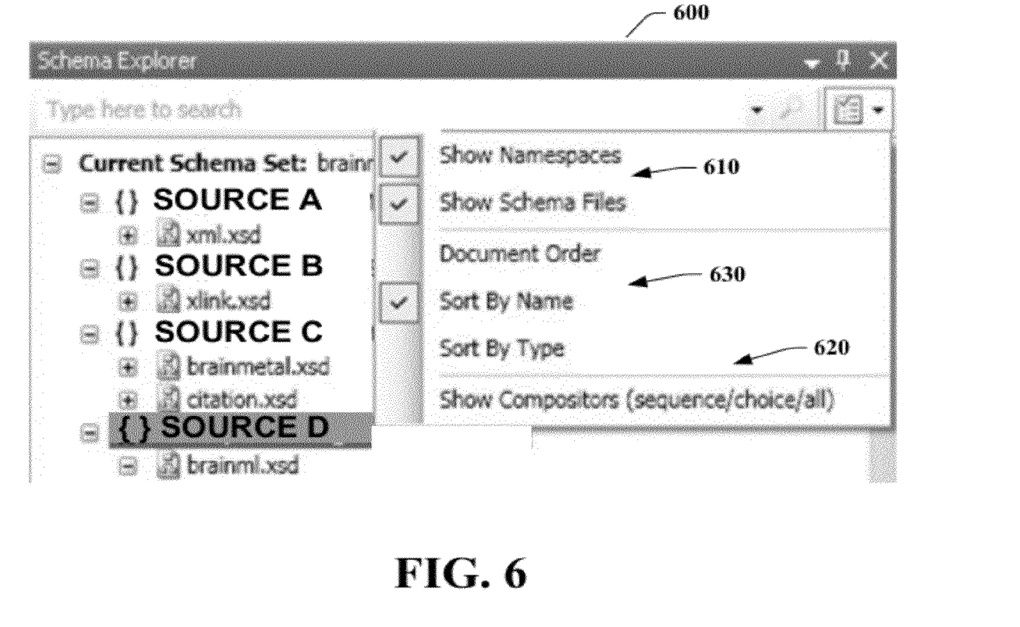
FIG. 6 illustrates an example interface for sorting, filtering, and grouping options for schema sets.

Referring to FIG. 6, an example interface 600 illustrates sorting, filtering and grouping options for schema sets. The following sorting and filtering options can be available to the users. At 610, Show/Hide Namespaces (namespaces are shown by default) and Show/Hide Schema Files (schema files are shown by default) options can be provided. At 620, Show/Hide Compositors options can be provided (compositors are NOT shown by default). At 630, the following sorting options can be available to users. These include Sort by Name (default), Sort in Document Order, and Sort by Type, for example.

When sort by name (default) option is selected, global nodes can be sorted in the following order:
1. includes (in alphabetical order of schemaLocation attributes)
2. imports (in alphabetical order of namespaces)
3. redefines (in alphabetical order of schemaLocation attributes)
4. Other globals in alphabetical order When "Show Schema Files" option is enabled, users can have an option to sort global nodes in document order. When this option is enabled, global nodes can be displayed in the order they appear in the xsd files. When "Show Schema Files" option is disabled sorting in document order is also disabled.

Users will also have an option to group globals by type. When this option is enabled, global nodes can be sorted in the following order (note that within each group nodes are sorted alphabetically): 1 includes; 2 imports; 3 redefines; 4 attributes; 5 attribute groups; 6 complex types; 7 simple types; 8 elements; and groups, for example. As can be appreciated, other arrangements are possible.

Figure 7:
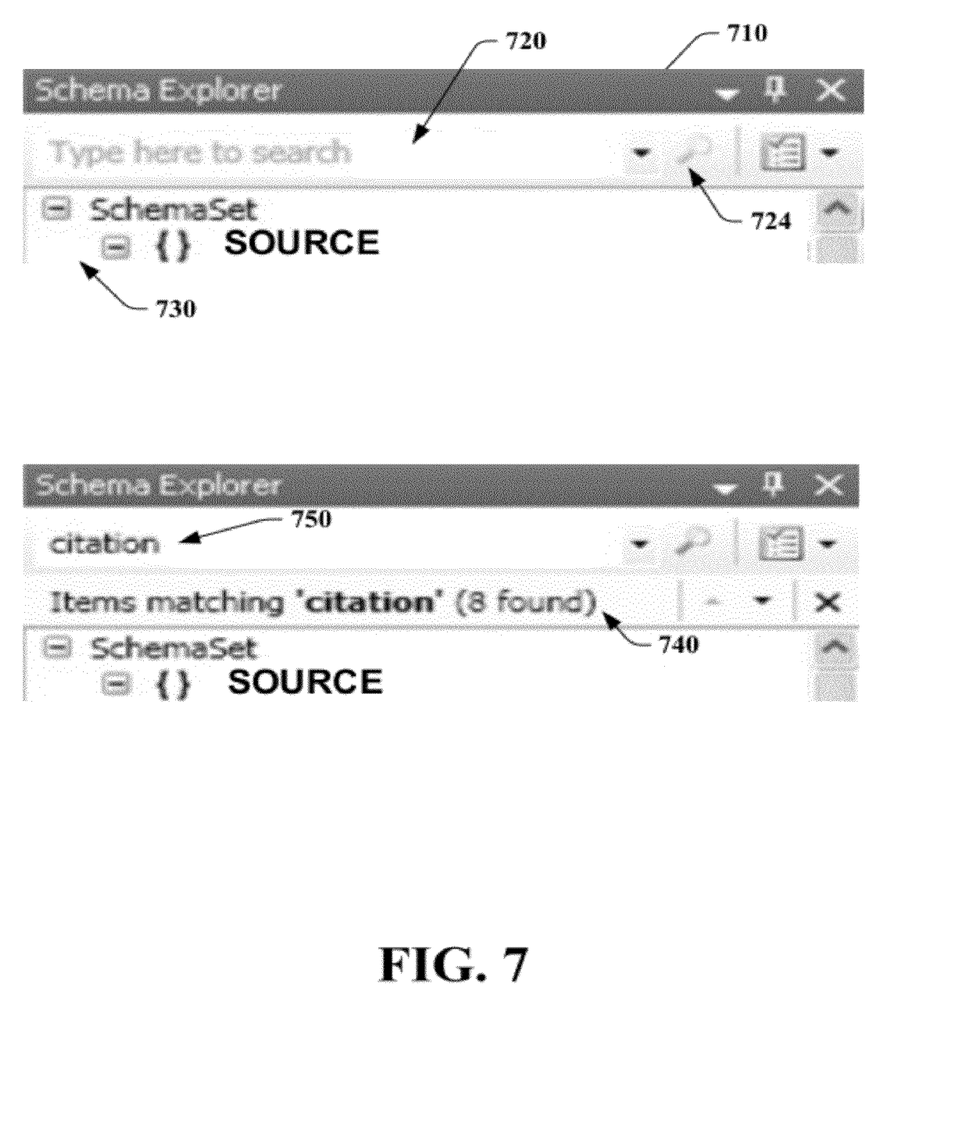
FIG. 7 illustrates example schema searching aspects.

Turning to FIG. 7, example interfaces illustrate schema searching aspects. Keyword searches can be performed via a substring search over the "name" and "ref" attributes of over the schema elements (elements, types, attributes, etc.) represented in the tree. At 710, a Search Toolbar is illustrated. Keyword search should be disabled if the search string is empty. The toolbar 710 includes an edit box 720 for specifying a search string and a search button 724 for initiating the search. When search results are displayed, a status bar is added to the toolbar at 730. The status bar 730 can include Status information about the search and the number of results, a Previous result button (up), a Next result button (down), and a Clear search results button for clearing results (empties the edit box, clears highlights, tick marks and status). As shown 740, search results are returned for the term "citation" shown at 750.

A number of schema-specific queries are available for various selected nodes. These include:
SchemaSet
Show most likely root elements
Namespaces
Show all inbound references (files that import selected namespace)
Show all outbound references (namespaces and files imported or included by files in selected namespace)
Files
Show all inbound references (files that import/include selected file)
Show all outbound references (namespaces and files imported or included by selected file)
Elements
Goto type definition (if relevant)
Goto the original element (for element references)
Show all references (for global elements)
Show members of substitution group (for members/heads of a substitution group). This should show direct and indirect participants
Show substitution group heads (for global elements that are members of a substitution group). This should show all direct and indirect heads
Types (note: we only show global types)
Show base type (if relevant)
Show all references
Show all derived types (direct and indirect)
Show all ancestors
Go to redefinition (if this type is redefined somewhere else in the schema)
Go to original definition (if this is a redefinition)
Attributes
Goto type definition (if relevant)
Goto the original attribute (for attribute references)
Show all references (for global attributes)

Attribute Groups
Goto definition (for references)
Show all references
Go to redefinition (if this attribute group is redefined somewhere else in the schema)
Go to original definition (if this is a redefinition)
Named groups
Goto definition (for references)
Show all references
Go to redefinition (if this group is redefined somewhere else in the schema)
Go to original definition (if this is a redefinition)

Figure 8:
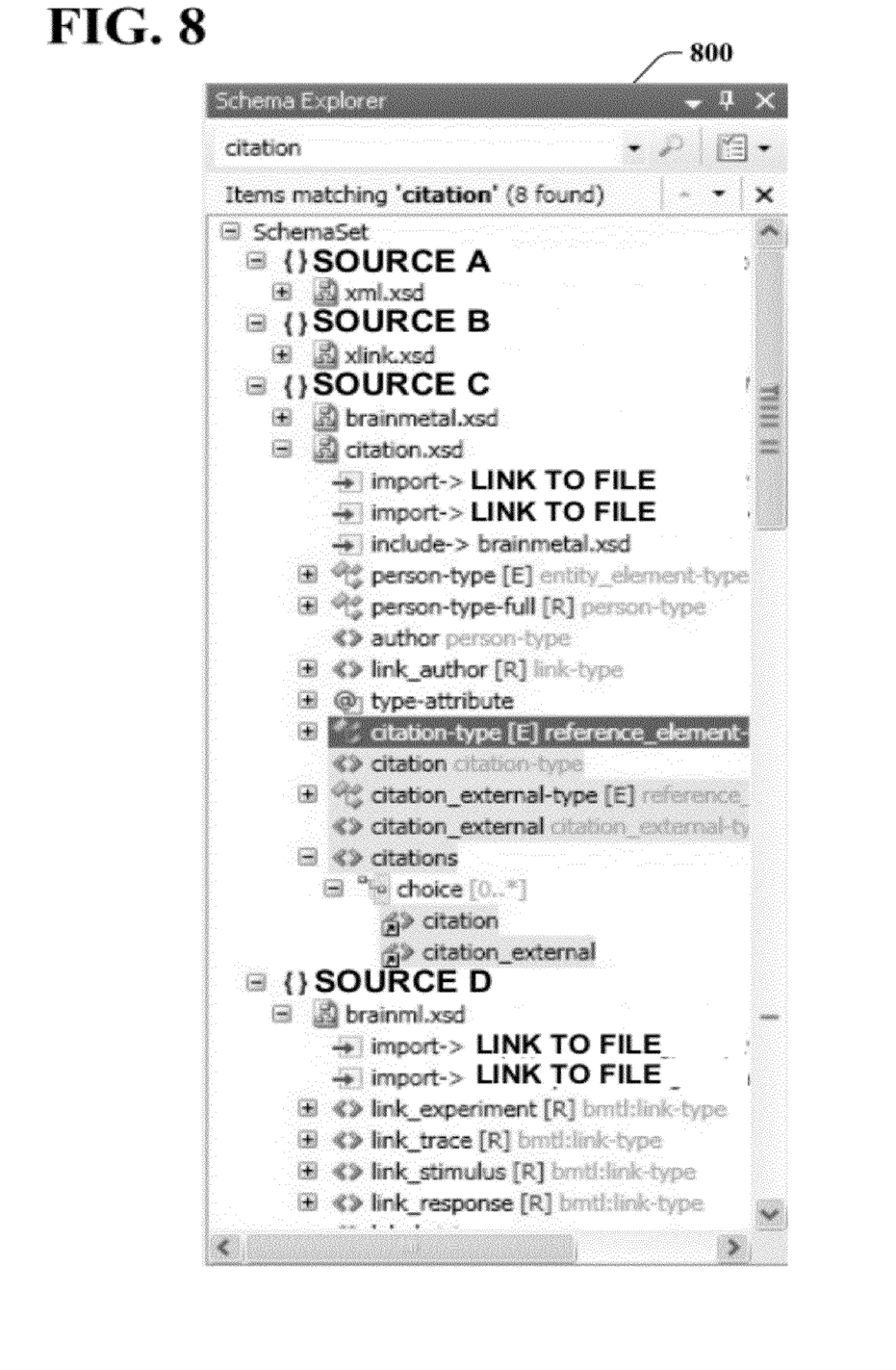
FIG. 8 illustrates an example interface for displaying search results.

Referring to FIG. 8, an example interface 800 for displaying search results is illustrated. Generally, hits resulting from keyword or schema-specific searches should be highlighted as shown at 810. In addition, a series of tick marks 820 should be placed alongside the vertical scroll bar to indicate the relative locations of all the hits in the tree. The tree will expand to show the respective search hits. For keyword searches, the tree can scroll to the first result from the current node and select it. For "Go to . . . " types of semantic queries, the tree can scroll to and display the resulting node. For "Show all . . . " types of semantic queries the selection can remain on the node that initiated the query and the tree will not scroll.

Users can also navigate search results in the following manner: Clicking on a tick mark to get to a specific search result; Using keyboard navigation—F3 to go to the next hit, Alt-F3 to go to the previous hit; and Clicking Next/Previous Search Result buttons. When the next/previous result is visible on the screen, navigating to it via one of the above methods can select that node. As can be appreciated, the interfaces and interface options shown in FIGS. 3-8 are exemplary in nature and other configurations, displays, and options are possible.

Figure 9:
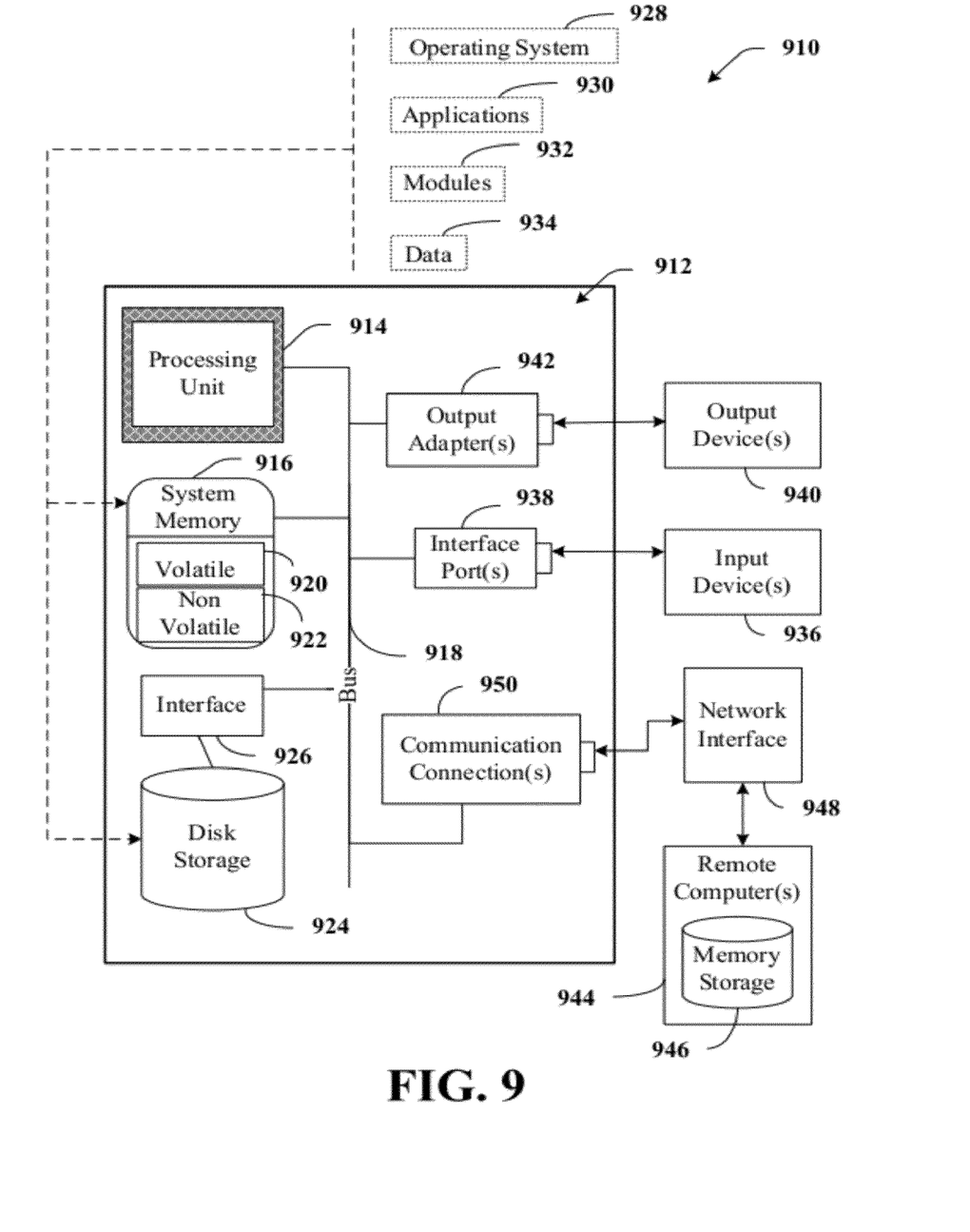
FIG. 9 is a schematic block diagram illustrating a suitable operating environment.
Figure 10:
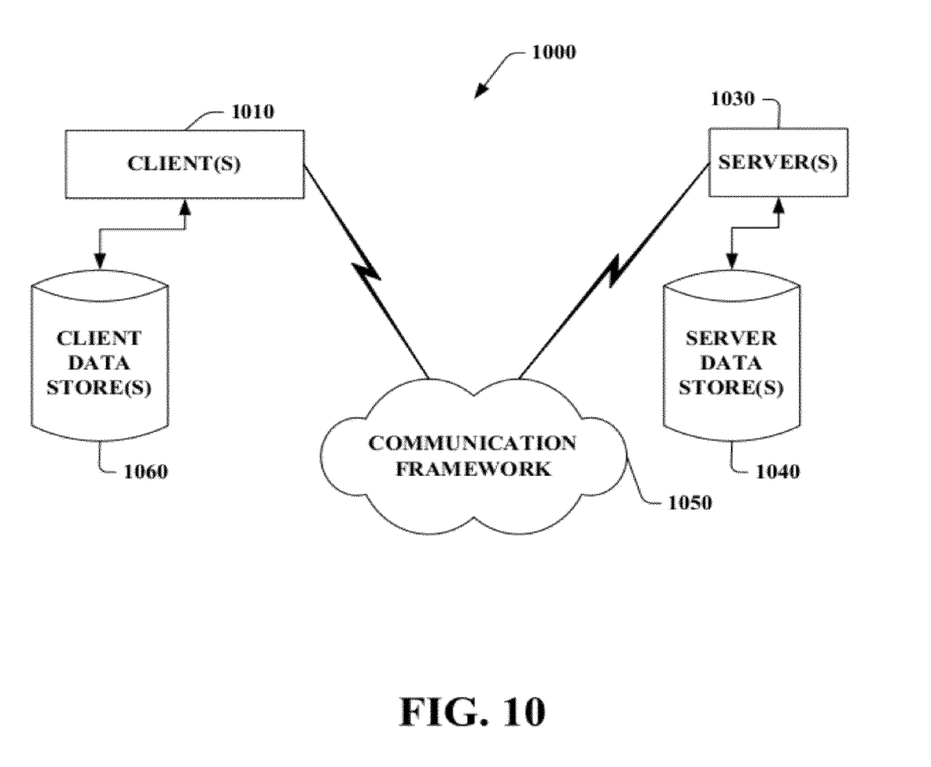
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 910 for implementing various aspects described herein includes a computer 912. The computer 912 includes a processing unit 914, a system memory 916, and a system bus 918. The system bus 918 couple system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A schema development system, comprising:
    a location component configured to determine relationships between XSD files, wherein at least one relationship is implicitly determined independent of an execution of instructions provided in an input, and wherein the location component is further configured to automatically construct a schema set from an original XSD file and the at least one relationship, the schema set including a first XSD file explicitly referenced by the original XSD file and a second XSD file implicitly referenced by a context of the original XSD file; and
    a processor component configured to perform software development operations across the schema set.

2. The system of claim 1, the location component configured to determine the second XSD file implicitly from at least one development file.

3. The system of claim 2, the development file is an XML file or an XSD file.

4. The system of claim 1, the software development operations are associated with at least one of a search operation or a semantic query.

5. The system of claim 1, further comprising a schema tree component configured to facilitate operations across the schema set.

6. The system of claim 5, the schema tree component includes a namespaces component, a files component, a globals component, or content models.

7. The system of claim 5, the schema tree component further comprises data structures that include one or more nodes.

8. The system of claim 1, further comprising an interface component configured to manipulate the schema set.

9. The system of claim 8, further comprising an indicator component configured to determine a position of a currently selected node or a returned result.

10. The system of claim 8, further comprising a search component configured to locate members of the schema set.

11. The system of claim 8, further comprising a sorting, filtering, and grouping component configured to control the interface component.

12. The system of claim 8, further comprising a context menu configured to facilitate processing of the schema set.

13. The system of claim 12, the context menu is associated with a namespace, a file, an element, a type, an attribute, an attribute group, or a named group.

14. The system of claim 8, further comprising a search toolbar configured to facilitate locating members of the schema set.

15. The system of claim 14, the search toolbar includes an edit box, a search button, or a search status bar.

16. The system of claim 8, further comprising a navigation component configured to navigate search results.

17. A method to process members of a schema set, comprising:
   employing a processor to execute computer executable instructions stored on a computer readable storage medium to implement the following acts:
      analyzing an original XSD file associated with a schema;
      determining relationships between XSD files, wherein at least one relationship is implicitly determined independent of an execution of instructions provided in an input; and
      automatically constructing a schema set from the original XSD file and the at least one relationship, wherein the schema set includes a first XSD file explicitly referenced by the original XSD file and a second XSD file implicitly referenced by a context of the original XSD file.

18. The method of claim 17, further comprising generating an interface to manipulate and process the schema set.

19. A computer-readable storage medium for facilitating schema development, comprising:
   computer-readable instructions, the computer-readable instructions including instructions for causing at least one processor to perform the following acts:
      determining relationships between XSD files, wherein at least one relationship is implicitly determined independent of an execution of commands provided in an input;
      identifying components of a schema in order to automatically determine a schema set from an original XSD file and the at least one relationship, wherein the schema set includes a first XSD file explicitly referenced by the original XSD file and a second XSD file implicitly referenced by a context of the original XSD file; and
      processing the schema set to facilitate software development across the schema set.

* * * * *